United States Patent
Du et al.

(10) Patent No.: US 8,189,463 B2
(45) Date of Patent: May 29, 2012

(54) METHOD FOR REALIZING BACKPRESSURE OF MASSES OF PORTS AND DEVICE THEREOF

(75) Inventors: Wenhua Du, Shenzhen (CN); Jacky Li, Shenzhen (CN); Xuefei Tan, Shenzhen (CN); Qiangsheng Ruan, Shenzhen (CN); Weijiang Hu, Shenzhen (CN); Songhai Chen, Shenzhen (CN); Xiumei Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 12/505,312

(22) Filed: Jul. 17, 2009

(65) Prior Publication Data

US 2009/0279435 A1 Nov. 12, 2009

Related U.S. Application Data

(63) Continuation of application No. PCT/CN2007/071217, filed on Dec. 11, 2007.

(30) Foreign Application Priority Data

Jan. 18, 2007 (CN) .......................... 2007 1 0001124

(51) Int. Cl.
*H04L 12/26* (2006.01)
(52) U.S. Cl. ........................................ 370/229; 370/465
(58) Field of Classification Search ........................ None
See application file for complete search history.

(56) References Cited

U.S. PATENT DOCUMENTS

| | | | |
|---|---|---|---|
| 6,671,255 B1 * | 12/2003 | Buhrgard et al. | 370/230 |
| 6,856,595 B1 | 2/2005 | Brown | |
| 2001/0048664 A1 | 12/2001 | Sano | |

(Continued)

FOREIGN PATENT DOCUMENTS

CN 1325211 12/2001

(Continued)

OTHER PUBLICATIONS

Partial translation of Chinese Patent Publication No. CN 1630296, 5 pages.

(Continued)

*Primary Examiner* — Kevin C Harper
(74) *Attorney, Agent, or Firm* — Finnegan, Henderson, Farabow, Garrett & Dunner LLP

(57) ABSTRACT

A method for realizing backpressure of masses of ports and a device realizing the method are disclosed. The method for realizing backpressure of masses of ports includes: detecting whether user data transmitted to a channelized physical port reaches a backpressure threshold, generating an idle frame or a series of idle frames when the backpressure threshold is reached; combining the idle frame with the user data which needs to be transmitted to the channelized physical port reaching the backpressure threshold, and transmitting the combined data; discarding the idle frame before the combined data enters the channelized physical port. The idle frame is employed in the present invention to realize the backpressure. The idle frame occupies some of the transmission bandwidth and reduces the bandwidth of user data, while the idle frame does not enter the physical port. Therefore, the aim of backpressure is achieved. The bandwidth of idle frame can be pre-configured according to the requirements. After the idle frame is generated, its bandwidth can be increased or decreased smoothly based on the existence of the backpressure. The control is very easy and convenient.

20 Claims, 3 Drawing Sheets

U.S. PATENT DOCUMENTS

2005/0270976 A1* 12/2005 Yang et al. .................... 370/229
2006/0182144 A1* 8/2006 Dove et al. .................... 370/470

FOREIGN PATENT DOCUMENTS

| | | | |
|---|---|---|---|
| CN | 1325211 | A | 12/2001 |
| CN | 1471264 | | 1/2004 |
| CN | 1471264 | A | 1/2004 |
| CN | 1630296 | A | 6/2005 |
| CN | 101026558 | | 8/2007 |
| CN | 101026558 | A | 8/2007 |
| EP | 0661851 | A2 | 7/1995 |
| EP | 1052816 | A2 | 11/2000 |
| EP | 1489796 | A2 | 12/2004 |
| JP | 2006324864 | | 11/2006 |
| JP | 2006324864 | A | 11/2006 |
| WO | 01/89140 | A2 | 11/2001 |

OTHER PUBLICATIONS

First Chinese Office Action dated (mailed) Feb. 6, 2009, issued in related Chinese Application No. 200710001124.1 Huawei Technologies C., LTD (32 pages).

European Patent Office Communication pursuant to Article 94(3) EPC, European search opinion for Application No. 07 846 061.5-2414, mailed Jul. 5, 2011, Huawei Technologies Co.

Written Opinion of the International Searching Authority (translation) dated (mailed) Mar. 6, 2008, issued in related Application No. PCT/CN2007/071217, filed Dec. 11, 2007, Huawei Technologies Co., Ltd., et al. (4 pgs.).

* cited by examiner

METHOD FOR REALIZING BACKPRESSURE OF MASSES OF PORTS AND DEVICE THEREOF

CROSS-REFERENCE TO RELATED APPLICATIONS

This application is a continuation of International Application No. PCT/CN2007/071217, filed Dec. 11, 2007, which claims the benefit of Chinese Patent Application No. 200710001124.1, filed Jan. 18, 2007, both of which are hereby incorporated by reference in their entireties.

FIELD OF THE INVENTION

The present invention relates to a control technique for backpressure of network ports, and more specifically, to a method for realizing backpressure of masses of ports and a device thereof.

BACKGROUND

Currently, with evolution of the network, specifically with huge applications on streaming media, there is a demand for a higher and differentiated performance of Quality of Service (QoS) in the network. No matter which policy is adopted to realize the QoS of the network, finally at several key nodes of the network, it should be capable of scheduling a plurality of sources to be scheduled (the source is generally a queue), based on pre-configured parameters (bandwidth, jitter, etc.), and transmitting data selected from an appropriate queue. When congestion occurs and packets need to be discarded, then the packets are discarded based on pre-configured parameters of Committed Information Rate/Peak Information Rate (CIR/PIR) priority, etc.

There are diverse selections on several queues scheduling, for example, Strict-Priority Queue (PQ) scheduling, Round Robin (RR) scheduling, improved Weighted Round Robin (WRR) scheduling, Weighted Fair Queue (WFQ) scheduling, etc. No matter which scheduling method is utilized, backpressure is always a headache. As to scheduling a plurality of queues, generally, reservation for bandwidth needs to be configured, for example, the bandwidth of queue A is 10 Mbps, the bandwidth of queue B is 1 Gbps, the bandwidth of queue C is 200 Mbps, etc. To achieve line rate forwarding performance, the sum of all reserved bandwidth of the queues may exceed or be equal to the final export bandwidth. At this time, there is a new inevitable problem caused by burst traffic or schedule offset, etc., i.e. the total allowable export traffic (1 Gbps or 2.5 Gbps, for example, which is limited to actual physical export,) is lower than the sum of actual bandwidth of all queues. As such, it is impossible to satisfy the actual bandwidth of all queues. A desirable instance may be as follow.

In a first instance, if total bandwidth of actual data does not exceed total export bandwidth, then it is desirable to perform scheduling based on the reserved bandwidth which is actually configured, and no backpressure occurs.

In a second instance, if transient burst traffic occurs on the actual data, which exceeds the total export traffic during some time period, at this time, caching may be performed in the export queues after export congestion occurs. When total bandwidth of the actual data is lower than export bandwidth, data in the cache may be transmitted, and also no backpressure occurs at this time.

In a third instance, if total bandwidth of actual data is always higher than total export bandwidth during quite a long time, then backpressure may occur. However, it is desirable that backpressure has effects on all queues participating in scheduling, and moreover, it is better to assign the effects according to reserved bandwidth proportion. That is to say, the actual scheduling bandwidth of queues participating in scheduling is better to shrink according to the reserved bandwidth proportion. Not all queues participate in bandwidth assigning. Rather, bandwidth assigning is performed among queues with actual data which are to be scheduled.

Currently, conventional standard QOS scheduling module is illustrated as FIG. 1, with four levels of scheduling in all. Firstly, different services are identified among users internally, and WFQ+SP (Strict Priority) scheduling is performed among different services. Then, CIR/PIR may be configured by the user, i.e. a committed bandwidth is provided for the user, and to a certain extent, burst traffic of user is allowed to pass. Next, the user may be mapped to different priority queues in the ports or different internal services of the user may be mapped to priority queues in the ports, and the priority levels are scheduled according to PQ scheduling. Finally, RR scheduling or WRR scheduling is performed among the ports. A module which accomplishes QOS function as illustrated in FIG. 1 may be referred to as a traffic management module. Generally, number of ports is in accordance with number of physical channels. Backpressure of physical channels may be delivered directly to ports. Then the ports deliver backpressure reversely in turn. At this time, the packets are cached in the traffic management module. When cache is full, the packets are discarded according to parameters of priority, CIR or PIR configured by the user, etc. In the case of guaranteeing user CIR, ensure that packets with high priority are scheduled first and packets with low priority are discarded first. Currently, conventional art usually inquires transmitting First In First Out (FIFO) status actively from a physical transmitting port via a traffic management module, or the physical transmitting port feeds back transmitting FIFO status actively to the traffic management module. If the transmitting FIFO exceeds backpressure threshold, the physical transmitting port outputs a backpressure signal to the traffic management module. The traffic management module stops transmitting and then caches packets in the scheduling queue. If the queue is full, then the packets are discarded according to the pre-configured parameters.

When there are too many physical channels, (for example, channelized POS (packet over SDH/SONET; where: SDH represents Synchronous Digital Hierarchy; SONET represents Synchronous Optical NETwork) ports may have 1 k physical ports), when egress of the traffic management module, for example, SPI4.2 port may only support 256 channels of backpressure signals, cannot respond to backpressure of all channels, negative feedback of backpressure cannot be formed. That is, according to the existing solution and interface specification, backpressure signals of masses of ports cannot be transmitted. Then, according to the existing technique, the egress rate is limited only through open loop control, i.e. shaping egress to limit its egress rate to be less than or be equal to physical port rate. With this technique, backpressure of physical channel is avoided, and fluctuation resulted from traffic variation is solved within the traffic management module internally. This method has three problems in actual application:

Common traffic management module inevitably has scheduling offset as to some packets with a fixed length when performing traffic scheduling. Such scheduling offset may cause transmitting queue congestion in physical ports, i.e. it may discard the packets when physical egress queue is full. Thus, configured parameters of user CIR and priority, etc. cannot be guaranteed.

In addition, shaping granularity of egress may not satisfy practical requirements, for example, the bandwidth of a low speed port is 64 k while the shaping granularity of egress is 20 k. If line rate of port is guaranteed, then shaping PIR has to be configured at 80 k. If there is no response to the backpressure, the packets may be discarded. At this time, discarding packets on the physical ports usually has to be performed as tail discarding or discarding according to the absolute priority. Thus, the configured parameters of user CIF and priority, etc. cannot be guaranteed.

Moreover, current channels transmitting backpressure signals of masses of ports are customized backpressure state bus, and there is no unified standard. Therefore, a common practice is to use a set of products, manufactured by the same factory as the physical port and traffic management module, to achieve backpressure of masses of ports. Consequently, the applications of the backpressure of masses of ports are limited, or cannot be applied to a developed system.

There are other solutions to achieve backpressure in conventional art. For example, the traffic management module is accomplished by a common CPU. By using CPU to forward data, the CPU directly inquires backpressure status of channels via control channel, thus avoiding the limit of number of channels.

When CPU participates in forwarding process, the forwarding performance is limited by the CPU capacity. Moreover, the CPU also participates in control plane processing, which results in a complexity of CPU procedure and a poorer reliability of CPU. In addition, as there are too many channels, CPU cannot handle backpressure in time, i.e. CPU cannot satisfy line rate forwarding in the case that there are relatively lots of channels.

SUMMARY

In order to solve the drawback of failure to realize backpressure of masses of ports in prior art, the present invention provides a method for backpressure of masses of ports and a device thereof The present invention has a high rate of backpressure and may satisfy the need for low speed port delay. There is no need for CPU to participate, thus the forwarding performance is not affected by CPU performance. Moreover, the present invention can be conveniently applied to various existing systems.

A technical solution utilized by an embodiment of the present invention to solve the technical problem is a method for realizing backpressure of massed of ports. The method includes:

detecting whether user data transmitted to a channelized physical port reaches a backpressure threshold, generating an idle frame or a series of idle frames when the backpressure threshold is reached;

combining the idle frame with the user data which needs to be transmitted to the channelized physical port reaching the backpressure threshold, and transmitting the combined data; and discarding the idle frame before the data combined from the idle frame and the user data, enters the channelized physical port.

A device for realizing backpressure of massed of ports is also provided according to one embodiment of the present invention. The device includes:

a detecting module, configured to detect whether user data transmitted to a channelized physical port reaches a backpressure threshold and transmit a message if the backpressure threshold is reached;

an idle frame generating module, configured to generate an idle frame or a series of idle frames after receiving the message;

a downstream queue scheduling module, configured to combine the idle frame with the user data which needs to be transmitted to the channelized physical port reaching the backpressure threshold, and transmit the combined data;

a downstream forwarding module, configured to transmit the combined data, transmitted by the downstream queue scheduling module, to the channelized physical port reaching the backpressure threshold; and a frame discarding module, configured to discard the idle frame before the combined data enters the channelized physical port reaching the backpressure threshold.

Embodiments of the present invention utilize idle frame to realize backpressure, The idle frame occupies some of transmission bandwidth and reduces bandwidth of user data. The idle frame is discarded before entering the physical port such that the idle frame does not enter the physical port. Therefore, the aim of backpressure is achieved.

The problem that too many channels result in failure of delivering backpressure to the traffic management module can be solved according to embodiments of the present invention. As such, problem of backpressure, whether caused by scheduling inaccuracy of the traffic management module or by burst traffic occurring on user data, can be effectively solved by solutions in the embodiments of the present invention. With solutions in the embodiments of the present invention, it is quick to deliver backpressure and easy to use, and the present invention can be applied to various existing systems conveniently.

DETAILED DESCRIPTION

The purposes, technical solutions and advantages concerning the embodiments of the present invention may become more readily appreciated by reference to the following description of the embodiments, when taken in conjunction with the accompanying drawings.

Figure 1:
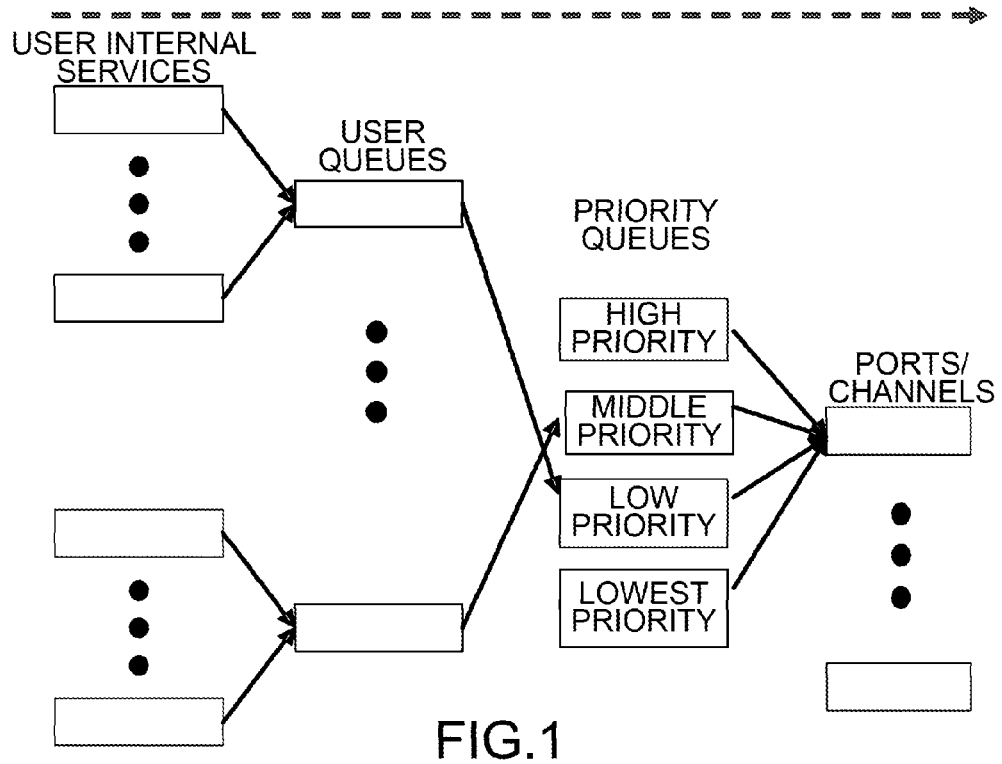
FIG. 1 is a schematic diagram of a method for realizing backpressure in conventional art.
Figure 2:
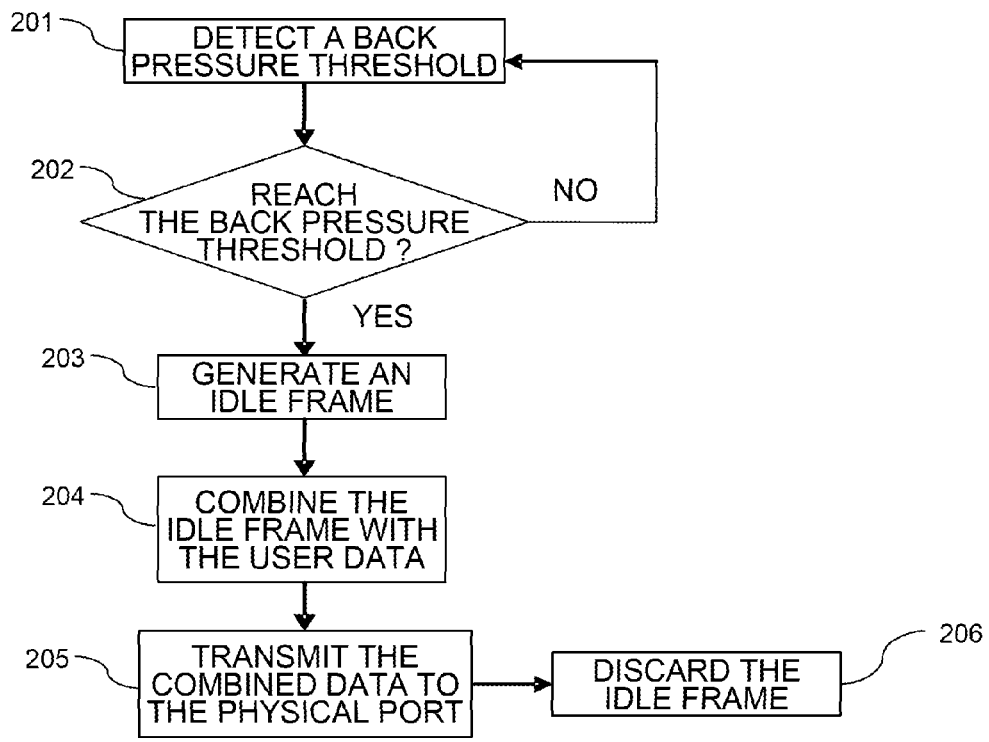
FIG. 2 is a schematic flowchart of a method for realizing backpressure of masses of ports according to one embodiment of the present invention.

FIG. 2 illustrates a schematic flowchart of a method for realizing backpressure of masses of ports according to one embodiment of the present invention. The method for realizing backpressure of masses of ports in the embodiment includes the following steps.

Step 201: Data traffic transmitted to a channelized physical port is detected. For example, detection for transmitting data traffic is realized by detecting transmission buffer status of channelized physical port.

Step 202: Data traffic is determined. That is, it is determined whether the transmission buffer reaches a backpressure threshold. If the transmission buffer reaches a backpressure threshold, step 203 is performed. If the transmission buffer does not reach a backpressure threshold, step 201 is performed.

Step 203: An idle frame or a series of idle frames are generated.

Step 204: The idle frame is combined with the user data transmitted to the channelized physical port reaching the backpressure threshold. The priority of the idle frame may be configured as high. The combined data may be transmitted to a traffic management module for scheduling. The traffic management module may discard the received data in case of congestion, etc. The traffic management module may discard data according to the priority level. For example, if an idle frame is of a high priority level, then the traffic management module first discards the user data in the combined data.

Step 205: The combined data combined from the idle frame and the user data, is transmitted to the channelized physical port reaching the backpressure threshold.

Step 206: The idle frame is discarded before the idle frame and user data enter the channelized physical port.

At step 203, an initial bandwidth value of the generated idle frame may be pre-configured. For example, the initial bandwidth value of idle frame is set as a scheduling offset of a queue where the idle frame is located.

In this embodiment, a method for generating idle frame is utilized to realize backpressure of port. The idle frame is utilized to preempt bandwidth, thereby forcing the bandwidth of user data to decrease. Before entering the channelized physical port, the idle frame may be discarded rather than enter the channelized physical port. Only the user data with a reduced bandwidth enters the channelized physical port. Therefore, the aim of backpressure is achieved. Consequently, embodiments of the present invention embrace advantages of simple and easy implementation, well adaptation to the number of ports, and capability of realizing the backpressure of masses of ports, etc.

Figure 3:
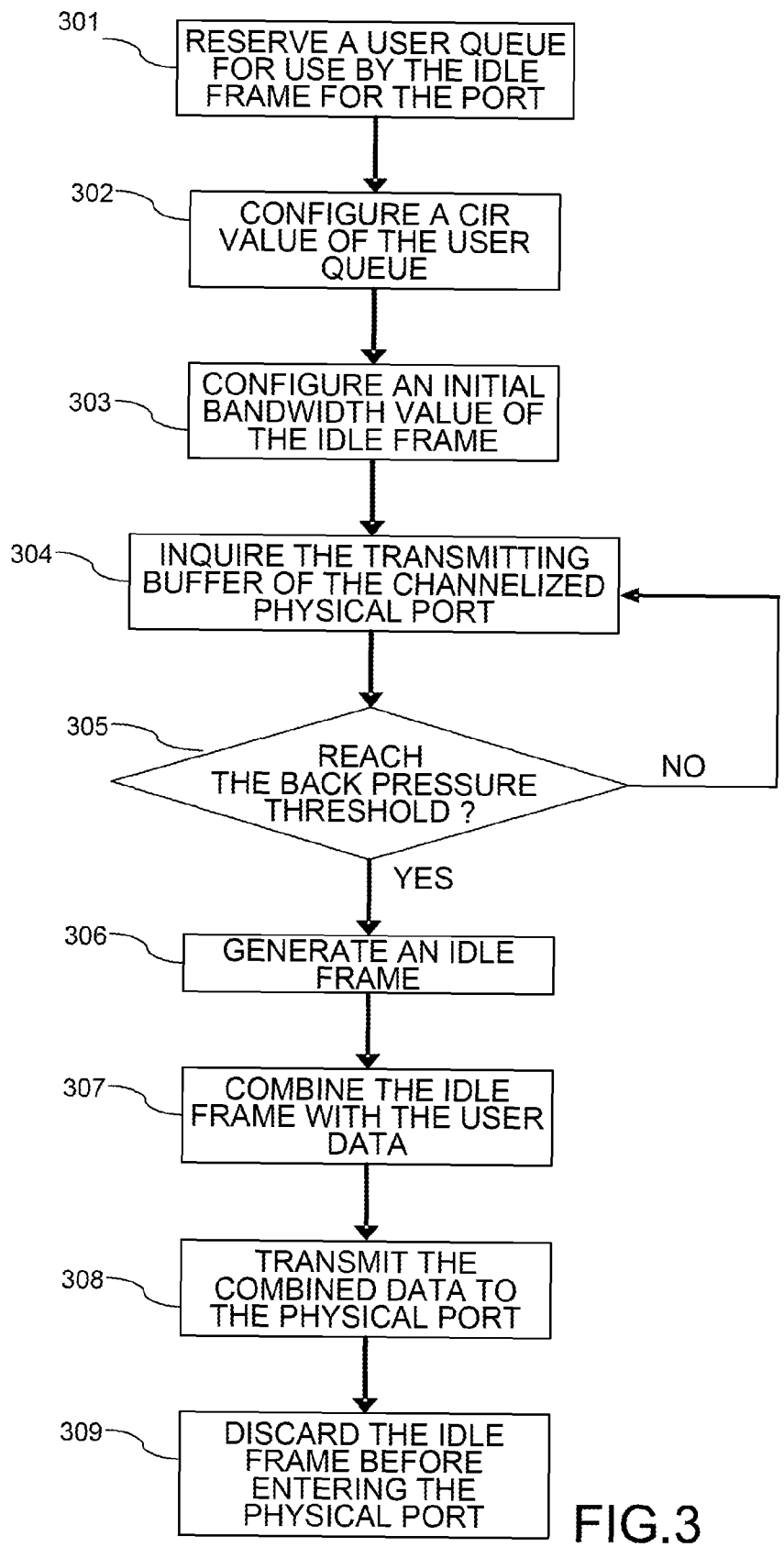
FIG. 3 is a schematic flowchart of a method for realizing backpressure of masses of ports according to another embodiment of the present invention.

FIG. 3 illustrates a schematic flowchart of a method for realizing backpressure of masses of ports according to another embodiment of the present invention. In this embodiment, before data traffic of channelized physical port is detected, each parameter is configured, in order to improve operation efficiency of the whole system. Specifically, the process includes the following steps.

Step 301: A user queue for use by an idle frame is reserved for each channelized physical port (or the channelized physical port which requires a backpressure). The method proceeds to perform step 302.

Step 302: A CIR value of the above mentioned user queue for use by an idle frame is configured as scheduling offset. For example, a transmitting rate of physical port is 64K, and a scheduling offset is 5%. A shaping granularity of port may be configured as 64K to satisfy the requirement. Then the CIR value of the user queue for use by an idle frame should be configured as 64K*5%=3.2K. If the granularity cannot satisfy the requirement, when a shaping granularity of port is 20K, the CIR value should be configured as 20K*4-64K+80K*5%=20K.

Step 303: An initial bandwidth value of an idle frame is configured. For example, an initial bandwidth value of an idle frame of a channel of 64K should be configured as 64K*5%=3.2K. If taking granularity factor into consideration, when a granularity is 20K, the initial bandwidth value of an idle frame may be configured as 20K*4-64K+80K*5%=20K.

Step 304: The transmission buffer of channelized physical port corresponding to a certain user data is inquired.

Step 305: It is determined whether the transmission buffer of channelized physical port reaches backpressure threshold. If the transmission buffer of channelized physical port reaches backpressure threshold, step 306 is performed. If the transmission buffer of channelized physical port does not reach backpressure threshold, step 304 is performed.

Step 306: An idle frame or a series of idle frames are generated. The bandwidth value of the idle frame is the initial bandwidth value configured in step 303. The generated idle frame is stored in a user queue for use by the idle frame.

Step 307: The idle frame in the user queue for use by the idle frame is combined with the user data in the channelized physical port reaching the backpressure threshold.

Step 308: The combined data combined from the idle frame and the user data is transmitted to the channelized physical port reaching the backpressure threshold.

Step 309: The idle frame is discarded before the combined data combined from idle frame and user data enters the physical port.

If backpressure still exists after the idle frame is generated, then increase the bandwidth of the idle frame. If backpressure disappears, then reduce the bandwidth of the idle frame until the bandwidth of the idle frame turns to zero. The increase or decrease may be performed smoothly when increasing or decreasing the bandwidth of the idle frame. One of examples is to increase or decrease a certain amount of bandwidth (e.g. 1 k) within each time unit (e.g. 1 second). If backpressure still exists or has disappeared, then a certain amount of bandwidth is increased or decreased again in a next time unit.

Compared with the previous embodiment, before backpressure threshold of each channelized physical port is detected, a CIR value of a user queue for use by an idle frame is configured. When the user data of a certain channelized physical port is found reaching a backpressure threshold, pre-configured parameters can be invoked directly. Thus operation efficiency is improved. In addition, detection for backpressure threshold of channelized physical port is realized by detecting whether the transmission buffer of channelized physical port reaches the backpressure threshold. If user data traffic is greater than total traffic of egress within a certain time period while transmission buffer has not reached the backpressure threshold, then no backpressure is performed. Thus, the situation that frequent backpressure affects stability of user network can be prevented.

Figure 4:
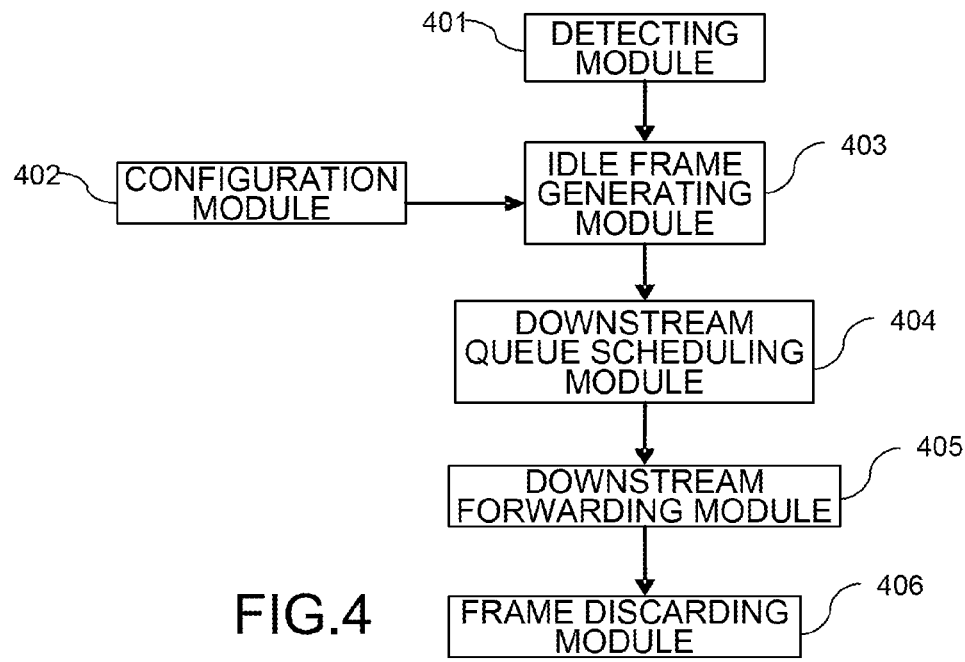
FIG. 4 is a structural schematic diagram of a device for realizing backpressure of masses of ports according to one embodiment of the present invention.

Referring to FIG. 4, a device for realizing backpressure of masses of ports according to one embodiment of the present invention, includes the following modules:

a detecting module 401, configured to detect whether user data transmitted to a channelized physical port reaches a backpressure threshold, and transmit a message to an idle frame generating module 403 if the backpressure threshold is reached;

an idle frame generating module 403, which is located in a transmitting start port of the user data and configured to generate an idle frame or a series of idle frames when receiving a message transmitted by the detecting module 401 indicating that the user data reaches the backpressure threshold.

a downstream queue scheduling module 404, configured to combine an idle frame generated by the idle frame generating module with the user data, and transmit the combined data in a downstream direction (a direction from a transmitting end to a receiving end of user data) to a downstream forwarding module;

a downstream forwarding module 405, configured to transmit the data which is combined from the idle frame and the user data and transmitted by the downstream queue scheduling module 404, to the channelized physical port reaching the backpressure threshold; and a frame discarding module 406, configured to discard the idle frame before the data, combined from the idle frame and the user data, enters the channelized physical port reaching the backpressure threshold.

In another embodiment of the invention, a configuration module 402 configured to configure an initial bandwidth value of idle frame may also be included. The bandwidth of idle frame generated by the idle frame generating module 403 is the initial bandwidth value configured by the configuration module 402.

In this embodiment, the idle frame generating module may be located in a transmitting start port of user data. After being generated, the idle frame is combined with the user data by the downstream queue scheduling module and is transmitted to the channelized physical port by the downstream forwarding module. In this embodiment, generating idle frame is utilized to realize backpressure of port. The idle frame is utilized to preempt bandwidth, thereby, the bandwidth of user data is forced to decrease. Before entering the channelized physical port, the idle frame may be discarded rather than enter the channelized physical port. Only the user data with a reduced bandwidth enters the channelized physical port. Therefore, the aim of backpressure is achieved. Consequently, embodiments of the present invention embrace advantages of simple and easy implementation, well adaption to the number of ports, and capability of realizing the backpressure of masses of ports, etc.

Figure 5:
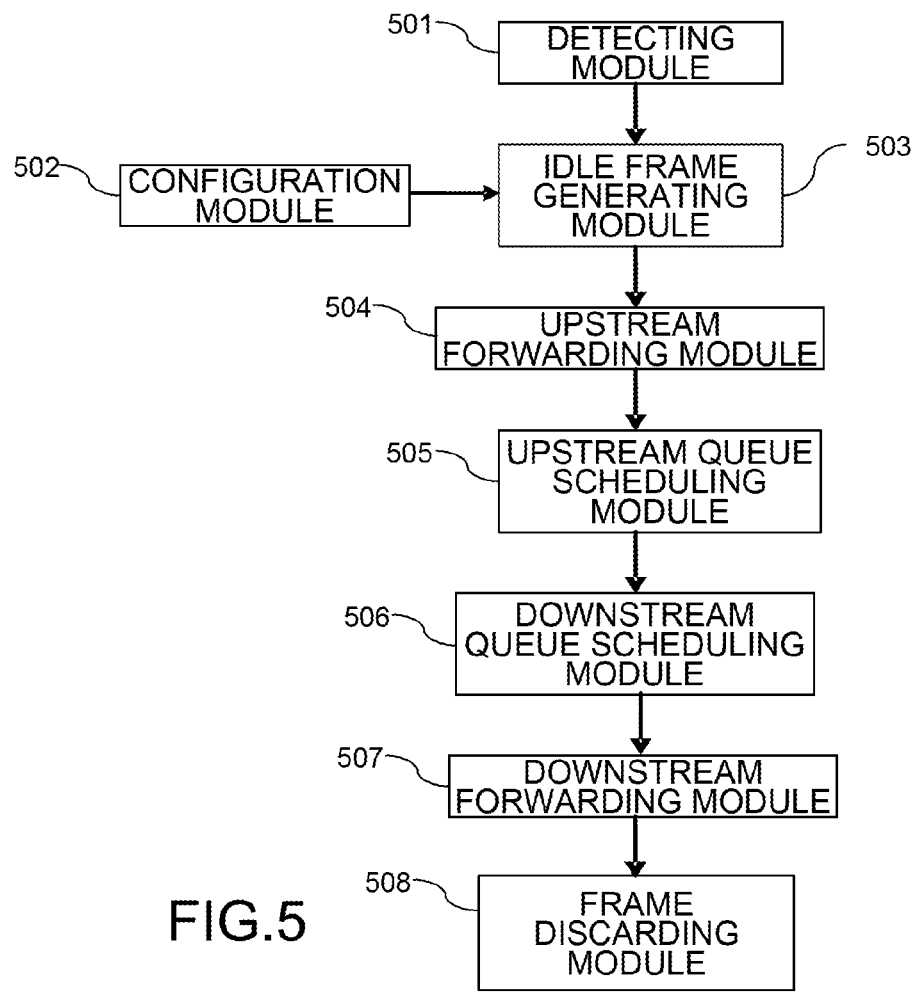
FIG. 5 is a structural schematic diagram of a device for realizing backpressure of masses of ports according to another embodiment of the present invention.

In another embodiment of the present invention, the device for realizing backpressure of masses of port may also be realized by structures illustrated in FIG. 5. The device includes:

a detecting module 501, configured to detect whether user data transmitted to a channelized physical port reaches a backpressure threshold, and transmit a message to an idle frame generating module 503 if the backpressure threshold is reached;

an idle frame generating module 503 located in a transmitting end port of user data, configured to generate an idle frame or a series of idle frames when receiving a message transmitted by the detecting module 501 indicating that the user data reaches the backpressure threshold;

an upstream forwarding module 504, configured to forward the idle frame generated by the idle frame generating module in an upstream direction (a direction from a receiving end to a transmitting end of user data) to an upstream queue scheduling module 505;

an upstream queue scheduling module 505, configured to forward the idle frame transmitted by the upstream forwarding module 504 to a downstream queue scheduling module 506;

a downstream queue scheduling module 506, configured to combine the idle frame generated by the upstream queue scheduling module 505 with the user data, and transmit the combined data to a downstream forwarding module 507;

a downstream forwarding module 507, configured to transmit the data to the channelized physical port reaching backpressure threshold, where the data is combined from the idle frame transmitted by the downstream queue scheduling module 506 and the user data; and a frame discarding module 508, configured to discard the idle frame before the data enters the channelized physical port, where the data is combined from the idle frame and the user data and transmitted by the downstream forwarding module 507.

In another embodiment of the invention, a configuration module 502, configured to configure an initial bandwidth value of idle frame may also be included. The bandwidth of idle frame generated by the idle frame generating module 503 is the initial bandwidth value configured by the configuration module 502. In the forwarding process for idle frame by the upstream forwarding module 504 and the upstream queue scheduling module 505, the upstream forwarding module 504 and the upstream queue scheduling module 505 perform transparent transmission merely for the idle frame.

In this embodiment, the idle frame generating module is located in the transmitting end port of user data. After being generated, the idle frame is forwarded by the upstream forward module and the upstream queue scheduling module to the downstream queue scheduling module first. Then the idle frame and the user data are combined by the downstream queue scheduling module and are transmitted to the channelized physical port by the downstream forwarding module. The upstream forwarding module and the upstream queue scheduling module are existing modules in prior art. Similarly, this embodiment utilizes a method of generating idle frame for realizing backpressure of ports. The idle frame is utilized to preempt bandwidth, thereby forcing the bandwidth of user data to decrease. Before entering the channelized physical port, the idle frame may be discarded rather than enter the channelized physical port. Only the user data with a reduced bandwidth enters the channelized physical port. Therefore, the aim of backpressure is achieved. Consequently, embodiments of the present invention embrace advantages of simple and easy implementation, well adaptation to the number of ports, and capability of realizing the backpressure of masses of ports, etc.

The software involved in the embodiments of the present invention may be stored in a computer readable storage medium.

The foregoing are merely exemplary embodiments of the present invention, while the scope of the present invention is not so limited. Any variations or equivalents can be readily appreciated by those skilled in the art. These variations or equivalents shall be construed as falling within the scope of the present invention.

What is claimed is:

1. A method for realizing backpressure of masses of ports, comprising:
   detecting whether user data transmitted to a channelized physical port reaches a backpressure threshold, generating an idle frame or a series of idle frames when the backpressure threshold is reached;
   combining the idle frame with the user data which needs to be transmitted to the channelized physical port reaching the backpressure threshold, and transmitting the combined data; and
   discarding the idle frame, before the combined data combined from the idle frame and the user data enters the channelized physical port.

2. The method of claim 1, wherein the step of generating an idle frame or a series of idle frames further comprises:
   storing the idle frame in a user queue employed by the idle frame and reserved for the channelized physical port.

3. The method of claim 2, wherein a Committed Information Rate value of the user queue for use by the idle frame is a scheduling offset.

4. The method of claim 1, wherein the step of generating an idle frame or a series of idle frames comprises: generating an idle frame or a series of idle frames based on a pre-configured initial bandwidth value of idle frame.

5. The method of claim 1, wherein the detecting of whether the user data transmitted to the channelized physical port reaches the backpressure threshold comprises detecting whether a transmission buffer of the channelized physical port reaches the backpressure threshold.

6. The method of claim 2, wherein the detecting of whether the user data transmitted to the channelized physical port reaches the backpressure threshold comprises detecting whether a transmission buffer of the channelized physical port reaches the backpressure threshold.

7. The method of claim 3, wherein the detecting of whether the user data transmitted to the channelized physical port reaches the backpressure threshold comprises detecting whether a transmission buffer of the channelized physical port reaches the backpressure threshold.

8. The method of claim 4, wherein the detecting of whether the user data transmitted to the channelized physical port reaches the backpressure threshold comprises detecting whether a transmission buffer of the channelized physical port reaches the backpressure threshold.

9. The method of claim 1, further comprising:
after the idle frame is generated, if the user data transmitted to the channelized physical port still reaches the backpressure threshold, then increasing the bandwidth of the idle frame to be combined; if the user data transmitted to the channelized physical port does not reach the backpressure threshold, then decreasing the bandwidth of the idle frame to be combined.

10. The method of claim 2, further comprising:
after the idle frame is generated, if the user data transmitted to the channelized physical port still reaches the backpressure threshold, then increasing the bandwidth of the idle frame to be combined; if the user data transmitted to the channelized physical port does not reach the backpressure threshold, then decreasing the bandwidth of the idle frame to be combined.

11. The method of claim 3, further comprising:
after the idle frame is generated, if the user data transmitted to the channelized physical port still reaches the backpressure threshold, then increasing the bandwidth of the idle frame to be combined; if the user data transmitted to the channelized physical port does not reach the backpressure threshold, then decreasing the bandwidth of the idle frame to be combined.

12. The method of claim 4, further comprising:
after the idle frame is generated, if the user data transmitted to the channelized physical port still reaches the backpressure threshold, then increasing the bandwidth of the idle frame to be combined; if the user data transmitted to the channelized physical port does not reach the backpressure threshold, then decreasing the bandwidth of the idle frame to be combined.

13. The method of claim 9, wherein the decreasing of the bandwidth of the idle frame to be combined comprises: decreasing the bandwidth of the idle frame to be combined to zero.

14. The method of claim 10, wherein the decreasing of the bandwidth of the idle frame to be combined comprises: decreasing the bandwidth of the idle frame to be combined to zero.

15. The method of claim 11, wherein the decreasing of the bandwidth of the idle frame to be combined comprises: decreasing the bandwidth of the idle frame to be combined to zero.

16. The method of claim 12, wherein the decreasing of the bandwidth of the idle frame to be combined comprises: decreasing the bandwidth of the idle frame to be combined to zero.

17. A device for realizing backpressure of masses of ports, comprising:
a detecting module, configured to detect whether user data transmitted to a channelized physical port reaches a backpressure threshold, and transmit a message if the backpressure threshold is reached;
an idle frame generating module, configured to generate an idle frame or a series of idle frames after receiving the message;
a downstream queue scheduling module, configured to combine the idle frame with the user data which needs to be transmitted to the channelized physical port reaching the backpressure threshold, and transmit the combined data;
a downstream forwarding module, configured to transmit the combined data transmitted by the downstream queue scheduling module, to the channelized physical port reaching the backpressure threshold; and
a frame discarding module, configured to discard the idle frame before the combined data enters the channelized physical port reaching the backpressure threshold.

18. The device of claim 17, further comprising:
a configuration module to configure an initial bandwidth value of idle frame, and enable the idle frame generating module to generate an idle frame or a series of idle frames based on the initial bandwidth value.

19. The device of claim 17, further comprising:
an upstream forwarding module, configured to forward the idle frame generated by the idle frame generating module in an upstream direction; and
an upstream queue scheduling module, configured to forward the idle frame forwarded by the upstream forwarding module to the downstream queue scheduling module.

20. The device of claim 18, further comprising:
an upstream forwarding module, configured to forward the idle frame generated by the idle frame generating module in an upstream direction; and
an upstream queue scheduling module, configured to forward the idle frame forwarded by the upstream forwarding module to the downstream queue scheduling module.

* * * * *